(12) United States Patent
Matsumoto et al.

(10) Patent No.: US 10,625,441 B2
(45) Date of Patent: Apr. 21, 2020

(54) METHOD FOR MANUFACTURING FORMED ARTICLE

(71) Applicant: Mitsubishi Gas Chemical Company, Inc., Tokyo (JP)

(72) Inventors: Nobuhiko Matsumoto, Hiratsuka (JP); Tomonori Kato, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 16/072,003

(22) PCT Filed: Oct. 19, 2017

(86) PCT No.: PCT/JP2017/037858
§ 371 (c)(1),
(2) Date: Jul. 23, 2018

(87) PCT Pub. No.: WO2018/092500
PCT Pub. Date: May 24, 2018

(65) Prior Publication Data
US 2019/0308345 A1 Oct. 10, 2019

(30) Foreign Application Priority Data
Nov. 16, 2016 (JP) .................... 2016-222992

(51) Int. Cl.
*B29B 13/08* (2006.01)
*B29B 11/16* (2006.01)
(Continued)

(52) U.S. Cl.
CPC .............. *B29B 13/08* (2013.01); *B29B 11/16* (2013.01); *C08J 5/042* (2013.01); *C08J 5/043* (2013.01);
(Continued)

(58) Field of Classification Search
CPC ......... B29B 13/08; B29B 11/16; B29C 33/06; B29C 35/08; B29C 35/0805;
(Continued)

(56) References Cited

U.S. PATENT DOCUMENTS 5,017,423 A * 5/1991 Bossmann .............. B29C 59/16
219/121.65
5,989,710 A 11/1999 Matsuo et al.
(Continued)

FOREIGN PATENT DOCUMENTS

CN 1807508 A 7/2006
CN 101511569 A 8/2009
(Continued)

OTHER PUBLICATIONS

Office Action dated Dec. 20, 2018, in corresponding Chinese Patent Application No. 201780007667.6.
(Continued)

*Primary Examiner* — Stella K Yi
(74) *Attorney, Agent, or Firm* — Fitch, Even, Tabin & Flannery LLP

(57) ABSTRACT

Provided is a method for manufacturing a formed article that excels in shape retainability and appearance, using a sheet that contains a thermoplastic resin fiber and a continuous reinforcing fiber. The method for manufacturing a formed article comprises irradiating laser light onto a sheet having, arranged therein with a certain directionality, yarns that contain a thermoplastic resin fiber and a continuous reinforcing fiber, so as to allow at least a part of the thermoplastic resin fiber to be impregnated into the continuous reinforcing fiber; the laser light being irradiated so as to satisfy at least one of A or B below, over at least 70% or more of the laser irradiation area; A: irradiated in a direction 5 to 85° away from the direction of arrangement of yarns in (Continued)

the in-plane direction of the sheet; and B: irradiated in a direction 30 to 60° away from the direction perpendicular to the sheet plane.

17 Claims, 3 Drawing Sheets

(51) Int. Cl.
*C08J 5/04* (2006.01)
*D02G 3/40* (2006.01)
*C08J 5/24* (2006.01)
*B29K 77/00* (2006.01)
*B29K 309/08* (2006.01)

(52) U.S. Cl.
CPC ............... *C08J 5/24* (2013.01); *D02G 3/402* (2013.01); *B29K 2077/00* (2013.01); *B29K 2309/08* (2013.01); *B29K 2995/0041* (2013.01); *C08J 2377/00* (2013.01)

(58) Field of Classification Search
CPC .... B29C 2035/0822; B29C 2035/0827; B29C 2035/0838; B29C 2035/0872; B29C 2035/0877; B29C 2035/0883; B29C 2045/0075; B29C 59/16; B29C 64/277; B29C 65/14; B29C 65/1403; B29C 65/1438; B29C 65/1448; B29C 65/1451; B29C 65/1629; B29C 65/1632; B29C 65/1635; B29C 65/1638; B29C 65/1641; B29C 65/1645; B29C 65/1648; B29C 65/1651; B29C 65/1658; B29C 65/1661; B29C 65/7473; B29C 66/0246; B29C 71/04; B29C 31/08; B29C 45/0005; B29C 45/14631; B29C 45/14786; B29C 2045/1723; B29C 48/2886; B29C 65/3408; B29C 65/3416; B29C 65/3436
See application file for complete search history.

(56) References Cited

U.S. PATENT DOCUMENTS

| | | | |
|---|---|---|---|
| 9,540,509 | B2 | 1/2017 | Kummer-Dorner et al. |
| 9,994,976 | B2 | 6/2018 | Nakai et al. |
| 10,000,662 | B2 | 6/2018 | Hochstetter et al. |
| 2006/0202395 | A1 | 9/2006 | Monsheimer et al. |
| 2008/0274355 | A1 | 11/2008 | Hewel |
| 2011/0065888 | A1 | 3/2011 | Inston |
| 2011/0288194 | A1 | 11/2011 | Brule et al. |
| 2012/0077398 | A1 | 3/2012 | Gaillard et al. |
| 2013/0248087 | A1 | 9/2013 | Gaillard et al. |
| 2014/0316063 | A1 | 10/2014 | Hochstetter et al. |
| 2015/0322622 | A1 | 11/2015 | Gaillard et al. |
| 2015/0376404 | A1 | 12/2015 | Kummer-Dorner et al. |
| 2016/0010246 | A1 | 1/2016 | Nakai et al. |
| 2016/0237597 | A1 | 8/2016 | Nakai et al. |
| 2017/0260657 | A1 | 9/2017 | Nakai et al. |
| 2018/0056553 | A1 | 3/2018 | Ohtani et al. |

FOREIGN PATENT DOCUMENTS

| | | |
|---|---|---|
| CN | 102076475 A | 5/2011 |
| CN | 102816429 A | 12/2012 |
| CN | 103313830 A | 9/2013 |
| CN | 105524462 A | 4/2016 |
| JP | H02-112916 A | 4/1990 |
| JP | H09-324331 A | 12/1997 |
| JP | 2012-526885 | 11/2012 |
| JP | 2013-091870 A | 5/2013 |
| JP | 2014-173196 A | 9/2014 |
| JP | 2015-501360 | 1/2015 |
| JP | 2015-067926 A | 4/2015 |
| JP | 2015-098669 A | 5/2015 |
| JP | 2016-509638 A | 3/2016 |
| JP | 2016-056478 | 4/2016 |
| WO | 2008029178 A1 | 3/2008 |
| WO | 2016/159340 A1 | 10/2016 |
| WO | 2016/167136 A1 | 10/2016 |

OTHER PUBLICATIONS

International Search Report for PCT/JP2017/037858, dated Jan. 16, 2018 and English translation submitted herewith (5 pages).

* cited by examiner (A)

(B)

(1)

(2)

METHOD FOR MANUFACTURING FORMED ARTICLE

CROSS-REFERENCE TO RELATED APPLICATIONS

This application is a U.S. national phase application filed under 35 U.S.C. § 371 of International Application PCT/JP2017/037858, filed Oct. 19, 2017, designating the United States, which claims priority from Japanese Application Number 2016-222992, filed Nov. 16, 2016.

FIELD OF THE INVENTION

This invention relates to a method for manufacturing a formed article, and in particular relates to a method for manufacturing a formed article, which includes processing a sheet having, arranged therein with a certain directionality, yarns that contain a thermoplastic resin fiber and a continuous reinforcing fiber.

BACKGROUND OF THE INVENTION

It has been a conventional practice to mix a continuous reinforcing fiber to a resin, in view of improving mechanical strength of a formed article composed of such resin. As a method for manufacturing such fiber-reinforced formed article, there has been known a method for forming pellets after mixing a thermoplastic resin with a continuous reinforcing fiber, and kneading them in a molten state.

In recent years, it has become popular to use a prepreg, which is a sheet-like intermediate material composed of a continuous reinforcing fiber and a thermoplastic resin impregnated thereto, and to process the prepreg into a formed article.

Further, it has been also discussed to use a yarn that contains a thermoplastic resin fiber and a continuous reinforcing fiber (see Patent Literature 1, for example).

CITATION LIST

Patent Literature

[Patent Literature 1] JP-A-2015-98669

SUMMARY OF THE INVENTION

A sheet such as woven fabric using the above-described yarn that contains a thermoplastic resin fiber and a continuous reinforcing fiber enjoys an advantage of good shape retainability. However, unlike the prepreg having the thermoplastic resin impregnated into the continuous reinforcing fiber, the aforementioned sheet contains the thermoplastic resin in a fiber form together with the continuous reinforcing fiber, so that the fibers would become loosened when handled, or the sheet would easily be deformed. One possible way would be heat setting of the yarn in a non-contact manner. More specifically, laser light is irradiated on the sheet to melt, with its energy, at least a part of the thermoplastic resin fiber so as to set the shape. However in some cases, the sheet using the yarn that contains the thermoplastic resin fiber and the continuous reinforcing fiber, when irradiated with laser light, was found to result in unsuccessful melting of the thermoplastic resin fiber. It was also found in some cases that gaps would occur between the yarns, to degrade the appearance of the formed article. This invention is aimed to solve the problem, and to provide a method for manufacturing a formed article that excels in shape retainability and appearance, using a sheet that contains a thermoplastic resin fiber and a continuous reinforcing fiber.

Considering the aforementioned problems, the present inventors found after investigations that the problems may be solved by means <1> below, and more preferably by means of <2> to <14>.

<1> A method for manufacturing a formed article, the method comprising irradiating laser light onto a sheet having, arranged therein with a certain directionality, yarns that contain a thermoplastic resin fiber and a continuous reinforcing fiber, so as to allow at least a part of the thermoplastic resin fiber to be impregnated into the continuous reinforcing fiber, the laser light being irradiated so as to satisfy at least one of A or B below, over at least 70% or more of the laser irradiation area:

A: irradiated in a direction 5 to 85° away from the direction of arrangement of yarns in the in-plane direction of the sheet; and B: irradiated in a direction 30 to 60° away from the direction perpendicular to the sheet plane.

<2> The method for manufacturing a formed article of <1>, wherein the yarns are commingled yarns that contain the thermoplastic resin fiber and the continuous reinforcing fiber.

<3> The method for manufacturing a formed article of <1> or <2>, wherein the sheet is a fabric using the yarns for at least one of warp or weft.

<4> The method for manufacturing a formed article of any one of <1> to <3>, wherein the yarns in the fabric have a width within the range from −75% to 300% of the maximum width of beam spot of the laser light.

<5> The method for manufacturing a formed article of any one of <1> to <4>, wherein the laser light is irradiated so as to satisfy at least A.

<6> The method for manufacturing a formed article of <5>, wherein the laser light is irradiated in a direction 10 to 80° away from the direction of arrangement of yarns in the in-plane direction of the sheet, over at least 70% or more of the laser irradiation area.

<7> The method for manufacturing a formed article of any one of <1> to <6>, wherein the continuous reinforcing fiber contains at least one of carbon fiber or glass fiber.

<8> The method for manufacturing a formed article of any one of <1> to <6>, wherein the continuous reinforcing fiber contains at least one type of glass fiber.

<9> The method for manufacturing a formed article of any one of <1> to <8>, wherein the laser light has an intensity of 1 to 50 J/mm.

<10> The method for manufacturing a formed article of any one of <1> to <9>, wherein the laser light is irradiated in a scanning mode.

<11> The method for manufacturing a formed article of <10>, wherein the laser light has a maximum width of beam spot of 0.5 to 6.0 mm.

<12> The method for manufacturing a formed article of any one of <1> to <11>, wherein the thermoplastic resin contains a crystalline resin.

<13> The method for manufacturing a formed article of any one of <1> to <11>, wherein the thermoplastic resin fiber contains a polyamide resin.

<14> The method for manufacturing a formed article of <13>, wherein the polyamide resin contains a structural unit derived from diamine and a structural unit derived from dicarboxylic acid, and 50 mol % or more of the structural unit derived from diamine is derived from xylylenediamine.

According to this invention, it now became possible to manufacture a formed article that excels in shape retainability and appearance, using a sheet that contains a thermoplastic resin fiber and a continuous reinforcing fiber.

DESCRIPTION OF EMBODIMENTS

Figure 1:
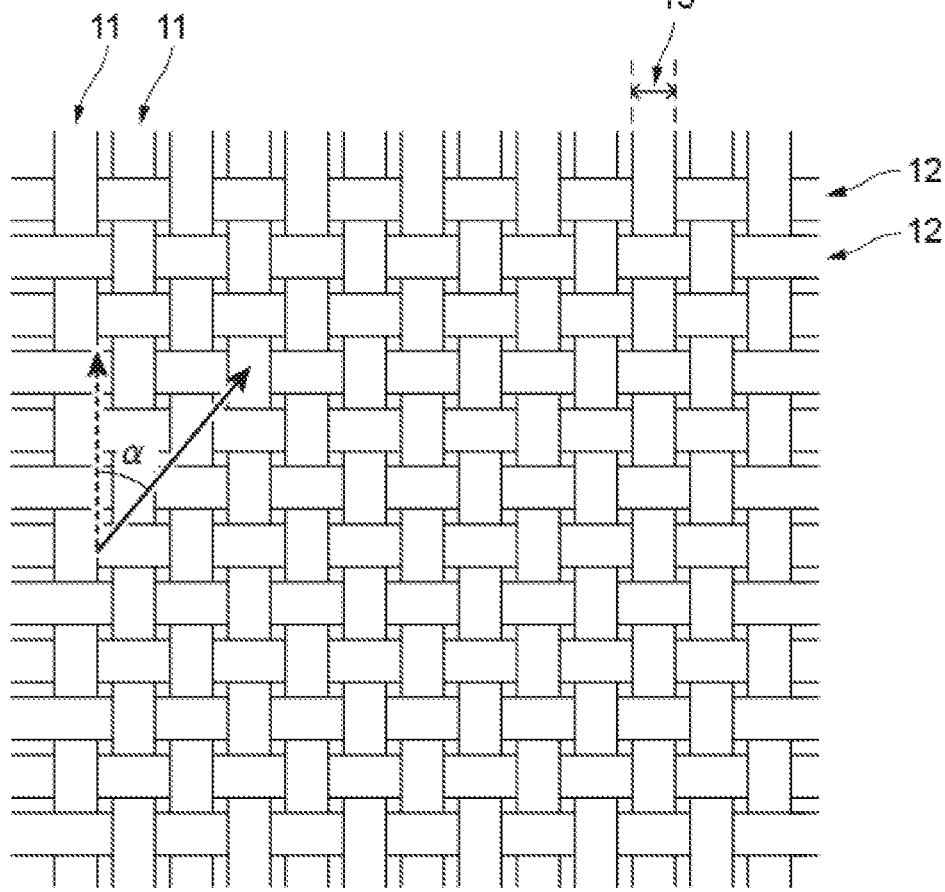
FIG. 1 is a schematic drawing illustrating angle or direction of irradiation of laser light in this invention.
Figure 1:
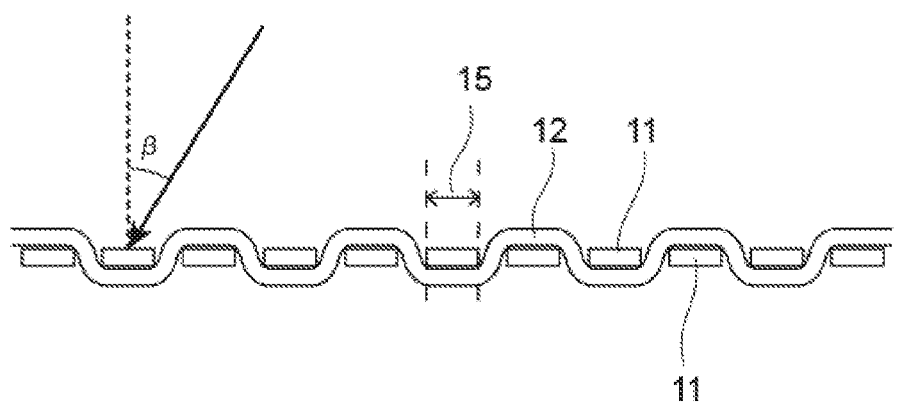

This invention will be detailed below. Note that all numerical ranges given in this specification, using "to" preceded and succeeded by numerals, are used to represent the ranges including these numerals respectively as the lower and upper limit values.

The method for manufacturing a formed article of this invention includes irradiating laser light onto a sheet having, arranged therein with a certain directionality, yarns that contain a thermoplastic resin fiber and a continuous reinforcing fiber, so as to allow at least a part of the thermoplastic resin fiber to be impregnated into the continuous reinforcing fiber, and now the laser light is irradiated so as to satisfy at least one of A or B below, over at least 70% or more of the laser irradiation area:

A: irradiated in a direction 5 to 85° away from the direction of arrangement of yarns in the in-plane direction of the sheet; and B: irradiated in a direction 30 to 60° away from direction perpendicular to the sheet plane.

Since, as described above, the sheet using the yarns that contains the thermoplastic resin fiber and the continuous reinforcing fiber have a surface irregularity, so that the laser light irradiated thereon would not fully reach the thermoplastic resin which resides in a recessed area, so that the thermoplastic resin fiber would not melt, that is, the impregnation would not properly proceed. This would result in insufficient shape retaining of the formed article, or poor appearance due to gaps that occurs between the yarns in the formed article.

In such circumstances, this invention was found to solve the problem by irradiating laser light so that the laser light will be scattered in the irradiation area. More specifically, scattering of the laser light may be increased by irradiating the laser light so as to have an angle to the yarn, or so as to be from an inclined direction. By increasing the scattering of laser light, it is presumed that an irradiation effect of laser light will increase, and thereby at least a part of the thermoplastic resin fiber will properly be melted even over the sheet with surface irregularity, which helps the impregnation proceed smoothly.

Now, the yarn in this invention may occasionally have, as described later, a part of the thermoplastic resin already impregnated into the continuous reinforcing fiber. Also in this case, at least a part of the thermoplastic resin fiber may be melted by the laser irradiation, so as to further allow the impregnation to proceed, contributing to shape retaining of the sheet.

The impregnation of the thermoplastic resin fiber into the continuous reinforcing fiber may occur partially or entirely, and preferably occurs partially. For example, impregnation ratio of the thermoplastic resin fiber into the sheet may typically be 1 to 20% or around. The impregnation ratio may be measured in the same way as a method for measuring impregnation ratio described later in paragraphs regarding a commingled yarn.

<Direction of Irradiation of Laser Light>

The laser light is irradiated, as described above, so as to satisfy at least one of A or B below, over at least 70% or more of the laser irradiation area:

A: irradiated in a direction 5 to 85° away from the direction of arrangement of yarns in the in-plane direction of the sheet; and B: irradiated in a direction 30 to 60° away from the direction perpendicular to the sheet plane.

Irradiation conditions A and B will be explained referring to FIG. 1. In FIG. 1, reference numeral 11 stands for warps that compose a sheet, and 12 stands for wefts that compose the sheet. In FIG. 1, each of the warps and the wefts is composed of the thermoplastic resin fiber and the continuous reinforcing fiber used in this invention. FIG. 1(A) is a top view of the sheet viewed from above the sheet plane, and FIG. 1(B) is a side view of the sheet viewed in the thickness direction.

According to "A", as illustrated in FIG. 1(A), the laser light is irradiated in a direction 5 to 85° (a in FIG. 1) away from the direction of arrangement of yarns in the in-plane direction of the sheet. In other words, assuming now one freely selectable direction along which the yarns are arranged, and the laser light is irradiated at angle $\alpha$ away therefrom. The laser light is usually irradiated in a scanning mode, wherein the solid arrow in FIG. 1(A) indicates the scanning direction of laser light. For example, when the sheet is a woven fabric composed of the warps and the wefts, the direction given by angle $\alpha$ may be determined based on the direction along which the warps of the sheet lie.

According to "B", as illustrated in FIG. 1(B), the laser light is irradiated in a direction 30 to 60° ($\beta$ in FIG. 1) away from the direction perpendicular to the sheet plane.

Although it suffices in this invention that the irradiation satisfies either one of "A" or "B", the irradiation may alternatively satisfy both of "A" and "B". In this invention, the irradiation preferably satisfy at least "A".

In "A", the angle (a) is 5 to 85°, and preferably 10 to 80°. If the angle is below 5° or exceeds 85°, gaps may occur between the yarns, leading to poor appearance of the formed article. In "A", when the drawing pattern is curved, the laser light is irradiated so that the tangent will satisfy the aforementioned angle. In the case of "A", the laser light may be controlled to give angle (a), by moving, for example, a laser irradiation window of a laser irradiation apparatus, or by moving the sheet per se.

In the case of "B", the angle ($\beta$) is 30 to 60°, and preferably 40 to 55°. If irradiated at an angle smaller than 30° or exceeding 60°, the light will less likely be scattered, and thereby the thermoplastic resin will not properly be impregnated. Such irradiation of laser light may be controllable, for example, by inclining the laser irradiation window of the laser irradiation apparatus to give angle ($\beta$).

In this invention, the laser light is irradiated so as to satisfy A or B, over at least 70% or more of the laser irradiation area. Preferably 80% or more, more preferably 85% or more, and even more preferably 90% or more area is irradiated so as to satisfy A or B. For example, the irradiation, when given in the direction indicated by the solid arrow in FIG. 1(A), is understood to irradiate nearly 100% of the laser irradiation area so as to satisfy the aforementioned "A".

Figure 2:
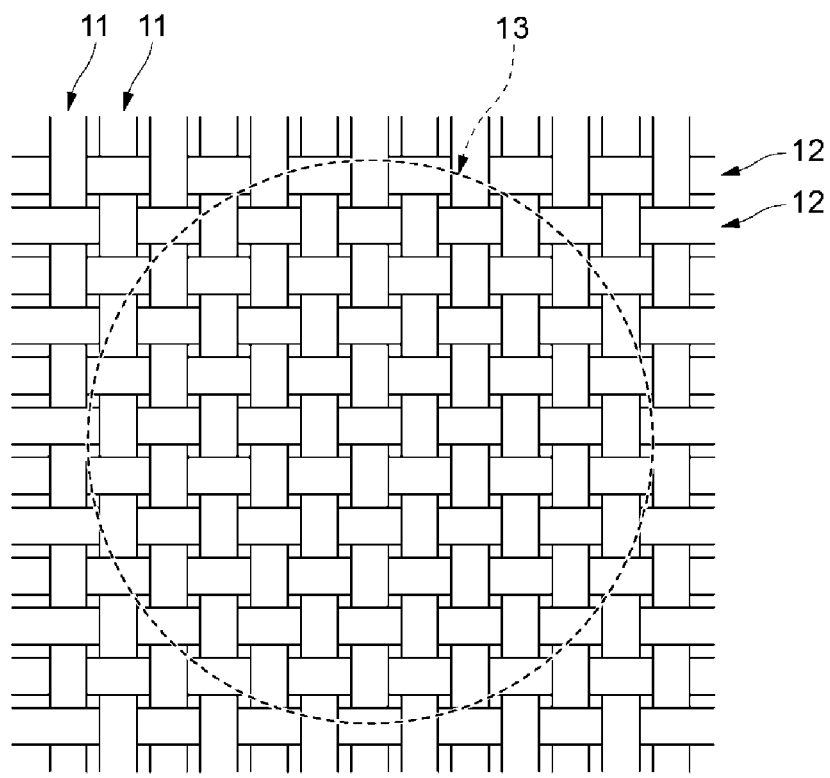
FIG. 2 is a schematic drawing illustrating area of irradiation of laser light in this invention.
Figure 2:
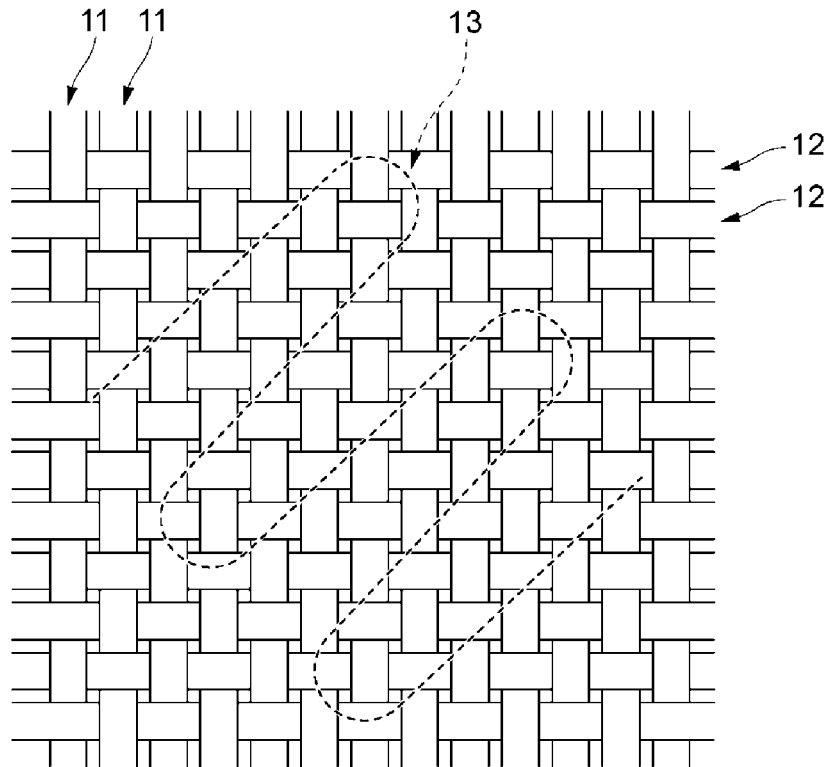

Drawing pattern of laser irradiation is not specifically limited so long as the aforementioned A or B is satisfied. The pattern may, for example, be circular as illustrated in FIG. 2(1), or may alternatively be meandering as illustrated in FIG. 2(2). In FIG. 2, reference numeral 11 stands for the warps, 12 for the wefts, and 13 for a laser irradiation area (travel route of the focal point of laser light) indicated by a broken line.

The laser irradiation is preferably given over an 1 to 50% region (area) of the sheet plane, which is more preferably 2 to 10%. By irradiating only a part of the sheet in this way, the yarns that compose the sheet can effectively be retained in a proper shape, for the convenience of further processing.

<Irradiation Conditions of Laser Light>

In this invention, irradiation intensity of laser light may properly be determined, mainly based on types of the continuous reinforcing fiber, which is preferably 1 to 50 J/mm.

For the case where glass fiber is used for the continuous reinforcing fiber, the irradiation intensity of laser light is preferably 1 to 50 J/mm, more preferably 5 to 50 J/mm, and even more preferably 10 to 40 J/mm. For the case where carbon fiber is used for the continuous reinforcing fiber, the irradiation intensity of laser light is preferably 1 to 50 J/mm, more preferably 2 to 30 J/mm, and even more preferably 3 to 20 J/mm. With the irradiation intensity of laser light controlled to the aforementioned upper limit or below, the sheet will more effectively be prevented from breaking or scorching.

In this invention, the laser light is irradiated typically in a scanning mode. Scanning speed of laser light, when used in a scanning mode, is preferably 1 to 10 mm/sec. A plurality of laser light beams may be used for the scanning.

Alternatively, a plurality of laser light beams may be irradiated at the same time without scanning, or the laser light beams may be irradiated on plane in addition to on spot.

The maximum width of beam spot of laser light is preferably 0.5 to 6.0 mm, more preferably 0.6 to 5.0 mm, even more preferably 0.8 to 3.0 mm, and yet more preferably 1.0 to 2.0 mm.

Meanwhile, the yarns in the fabric preferably have a width within the range from −75% to 300% of the maximum width of beam spot of the laser light, which is more preferably within the range from −50% to 250%, even more preferably from −50% to 150%, and yet more preferably from −50% to 120%. With such design, the thermoplastic resin will more effectively be impregnated, making the shape retaining easier. Now, the width of yarn, which composes the fabric and contains the thermoplastic resin fiber and the continuous reinforcing fiber, is determined by the width thereof when the yarn is viewed in the direction perpendicular to the fabric plane (sheet plane), which is typically the width 15 in FIG. 1(A) or FIG. 1(B). As for the yarns, at least either the warps or the wefts preferably satisfy the aforementioned conditions, and preferably both of the warps and the wefts satisfy the aforementioned conditions.

The focal point of laser light preferably falls within a ±20% range around the center in the thickness direction of sheet, which is more preferably within a ±10% range, and even more preferably within a ±5% range. By irradiating the laser light nearly at around the center in the thickness direction, the shape will more effectively be retained. It is, of course, within the scope of this invention to irradiate the laser light, by intentionally shifting the focal point to attain a desired level of shape retaining.

The irradiation window of laser light is typically, but not restrictively, circular or rectangular, wherein it is preferably circular.

Types of the laser light is not specifically limited so long as an intended purpose can be achieved, and is selectable from YAG laser, YVO4 laser, Yb laser, titanium sapphire laser, ruby laser, glass laser and carbon dioxide laser. The laser light preferably has a wavelength of 300 to 3000 nm, and is specifically exemplified by 1064 nm, 532 nm and 355 nm.

<Formed Article>

The formed article in the context of this invention means an article whose shape is retained by impregnating at least a part of the thermoplastic resin into the sheet used in a this invention by laser irradiation, and is not limited to a final product. For example, also those during a process of irradiation as illustrated in FIGS. 2(1) and 2(2) are included in the formed article in the context of this invention.

<Sheet>

The sheet used in this invention has, arranged therein with a certain directionality, yarns that contain the thermoplastic resin fiber and the continuous reinforcing fiber. Now, " . . . arranged therein with a certain directionality" means that the yarns, which compose the sheet such as woven fabric or knitted fabric, are regularly arranged. The surface over which the yarns are arranged may be curved, but is preferably flat. In this invention, the sheet is preferably a woven fabric composed of the warps and the wefts. Types of the fabric are exemplified by plain weave fabric, twill fabric and satin fabric, wherein plain weave fabric is preferable.

Weight of the sheet used in this invention is preferably 10 to 1000 $g/m^2$, and more preferably 50 to 500 $g/m^2$.

Of the yarns that compose the sheet in this invention, at least one of them is a yarn that contains the thermoplastic resin fiber and the continuous reinforcing fiber, but the other one may be a yarn other than the yarn that contains the thermoplastic resin fiber and the continuous reinforcing fiber. In this invention, more preferably, the sheet is a woven fabric composed of the warps and the wefts, wherein at least one of the warps and the wefts are yarns that contain the thermoplastic resin fiber and the continuous reinforcing fiber, and even more preferably, both of the warps and the wefts contain the thermoplastic resin fiber and the continuous reinforcing fiber. In this invention, the yarn that contains the thermoplastic resin fiber and the continuous reinforcing fiber is preferably a commingled yarn. With the commingled yarn used therein, the sheet will have an almost equal ratio of melting of the thermoplastic resin in a surficial part on one surface side and in a surficial part on the other surface side, when viewed in the thickness direction of sheet.

The yarn, other than the yarn that contains the thermoplastic resin fiber and the continuous reinforcing fiber, is exemplified by a yarn composed of the thermoplastic resin fiber, and a yarn composed of the continuous reinforcing fiber.

The sheet in this invention is preferably irradiated with laser light, after removing any foreign matters. By removing the foreign matters, in particular black matters that are more likely to absorb light, the sheet is effectively prevented from being excessively heated and burnt out, or from scorching, allowing more uniform shape retaining.

Prevention of contamination with foreign matters is also preferred in the process of manufacturing the sheet.

<Yarn>

The yarn used in this invention contains the thermoplastic resin fiber and the continuous reinforcing fiber. In other words, the yarn used in this invention is a fiber bundle composed of the thermoplastic resin fiber and the continuous reinforcing fiber. In the yarn used in this invention, the thermoplastic resin fiber and the continuous reinforcing fiber preferably account for 95% by weight or more, and more preferably 98% or more, of the fiber component that composes the yarn. The yarn used in this invention may contain a treatment agent such as surface modifier or sizing agent. Content of the treatment agent in the yarn used in this invention is preferably 0.001 to 1.5% by weight of the yarn, which is more preferably 0.1 to 1.2% by weight, and even more preferably 0.3 to 1.1% by weight.

In the yarn used in this invention, the fiber component preferably accounts for 80% by weight or more, which is more preferably 90% by weight or more, and even more preferably 95% by weight or more.

The yarn used this invention is exemplified by commingled yarn, interlaced yarn, twisted yarn and covering yarn, among which commingled yarn is preferable. The commingled yarn has dispersed therein the thermoplastic resin fiber and the continuous reinforcing fiber with high dispersity, so that the sheet after irradiated by laser light will have a small difference in molten states of the thermoplastic resin fiber between the upper surface and the lower surface.

In the yarn used in this invention, ratio of the continuous reinforcing fiber is preferably 10% by weight or more, more preferably 15% by weight or more, even more preferably 20% by weight or more, yet more preferably 30% by weight or more, furthermore preferably 40% by weight or more, still more preferably 50% by weight or more, and even may be 55% by weight or more. The upper limit of the ratio of continuous reinforcing fiber in the yarn is preferably 90% by weight or below, more preferably 80% by weight or below, even more preferably 70% by weight or below, and even may be 65% by weight or below.

Ratio of the thermoplastic resin fiber in the yarn is preferably 10% by weight or above, more preferably 20% by weight or above, even more preferably 30% by weight or above, and even may be 35% by weight or above. The upper limit of the ratio of the thermoplastic resin fiber in the yarn is preferably 90% by weight or below, more preferably 85% by weight or below, even more preferably 80% by weight or below, yet more preferably 70% by weight or below, furthermore preferably 60% by weight or below, still more preferably 50% by weight or below, and even may be 45% by weight or below.

In particular, the aforementioned ratios are preferably satisfied in a commingled yarn detailed later.

<<<Thermoplastic Resin Fiber>>

The thermoplastic resin fiber used in this invention may be staple fiber or filament fiber (continuous fiber), without special limitation.

When the thermoplastic resin fiber used in this invention is continuous thermoplastic resin fiber, it preferably has a number-average fiber length of 50 cm at the shortest, which is more preferably 1 m or longer. The upper limit of length of the continuous thermoplastic resin fiber used in this invention is preferably 20,000 m or shorter, more preferably 10,000 m or shorter, and even more preferably 7,000 m or shorter.

In other embodiment of the thermoplastic resin fiber used in this invention, the thermoplastic resin fiber preferably has a number-average fiber length exceeding 10 mm, which is more preferably exceeding 30 mm. The thermoplastic resin fiber used in this embodiment is typically 50 mm or below, at the longest.

The thermoplastic resin fiber in this invention may have a circular or flattened cross-sectional shape, wherein it is typically circular.

The thermoplastic resin contained in the thermoplastic resin fiber used in this invention may be a crystalline resin or an amorphous resin, without special limitation, wherein crystalline resin is preferable.

The thermoplastic resin employable in this invention include polyolefin resins such as polyethylene and polypropylene; polyester resins such as polyamide resin, polyethylene terephthalate, polybutylene terephthalate and polylactic acid; polycarbonate resin; styrene resins such as acrylonitrile-butadiene-styrene resin (ABS resin); polyoxymethylene resin; polyetherketone; polyethersulfone; polyphenylsulfone; polyetherimide; and polyimide. Polyamide resin is preferable. The polyamide resin employable in this invention will be detailed later.

When the thermoplastic resin is a crystalline thermoplastic resin, it preferably has a melting point of for example 165 to 390° C., which is more preferably 165 to 375° C., even more preferably 165 to 305° C., yet more preferably 175 to 295° C., and furthermore preferably 185 to 285° C., although depending on types of resin to be employed.

When a crystalline thermoplastic resin having high melting point is used as the thermoplastic resin, also usable is a highly heat resistant thermoplastic resin called "super engineering plastics". The super engineering plastics are exemplified by AURUM (registered trademark) from Mitsui Chemicals, Inc., and Victrex (registered trademark) PEEK Series from VICTREX plc.

One type, or two or more types of thermoplastic resins may be used.

When two or more types of thermoplastic resins are used, the melting point of thermoplastic resin is defined by the lowest melting points among those of the thermoplastic resins. When one thermoplastic resin has two or more melting points, the melting point of thermoplastic resin is defined by the lowest melting point.

<<<Polyamide Resin>>>

The polyamide resin used in this invention is exemplified by polyamide 4, polyamide 6, polyamide 11, polyamide 12, polyamide 46, polyamide 66, polyamide 6/66, polyamide 610, polyamide 612, polyhexamethylene terephthalamide (polyamide 6T), polyhexamethylene isophthalamide (polyamide 6I), polyamide 66/6T, polyxylylene adipamide, polyxylylene sebacamide, polyxylylene dodecamide, polyamide 9T, polyamide 9MT, and polyamide 6I/6T.

Among the aforementioned polyamide resins, from the viewpoints of formability and heat resistance, preferable is a polyamide resin having a structural unit derived from diamine and a structural unit derived from dicarboxylic acid, wherein 50 mol % or more of the structural unit derived from diamine is derived from xylylenediamine (referred to as "XD-based polyamide", hereinafter). By using such low water absorption polyamide just like the XD-based polyamide, the obtainable formed article will effectively be suppressed from foaming.

When the polyamide resin is a mixture, ratio of the XD-based polyamide in the polyamide resin is preferably 50% by weight or above, and more preferably 80% by weight or above.

In the XD-based polyamide, preferably 70 mol % or more of the structural unit derived from diamine is derived from metaxylylenediamine and/or paraxylylenediamine, which is more preferably 80 mol % or more, even more preferably 90 mol % or more, and particularly 95 mol % or more; meanwhile preferably 50 mol % or more of the structural unit derived from dicarboxylic acid is derived from a straight chain aliphatic α,ω-dicarboxylic acid having 4 to 20 carbon atoms, which is more preferably 70 mol % or more, even more preferably 80 mol % or more, yet more preferably 90 mol %, and furthermore preferably 95 mol % or more.

Diamines usable as the starting diamine component for the XD-based polyamide, but other than metaxylylenediamine and paraxylylenediamine, are exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl) propane, bis (aminomethyl)decalin, and bis(aminomethyl) tricyclodecane; and aromatic diamines such as bis(4-aminophenyl) ether, paraphenylenediamine, and bis (aminomethyl)naphthalene. Each of them may be used independently, or two or more of them may be used in a mixed manner.

When the diamine other than xylylenediamine is used as the diamine component, the ratio of use thereof is less than 50 mol % of the structural unit derived from diamine, which is preferably 30 mol % or less, more preferably 1 to 25 mol %, and particularly 5 to 20 mol %.

The straight chain aliphatic α,ω-dicarboxylic acid having 4 to 20 carbon atoms, suitably used for the starting dicarboxylic acid component of the polyamide resin, is exemplified by aliphatic dicarboxylic acids such as succinic acid, glutaric acid, pimelic acid, suberic acid, azelaic acid, adipic acid, sebacic acid, undecanedioic acid, and dodecanedioic acid. Each of them may be used independently or two or more of them may be used in a mixed manner. Among them, adipic acid or sebacic acid is preferable, since the polyamide resin will have the melting point suitable for forming.

The dicarboxylic acid component other than the straight chain aliphatic α,ω-dicarboxylic acid having 4 to 20 carbon atoms is exemplified by phthalic acids such as isophthalic acid, terephthalic acid and orthophthalic acid; and isomers of naphthalenedicarboxylic acid such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. Each of them may be used independently, or two or more of them may be used in a mixed manner.

When the dicarboxylic acid, other than the straight chain aliphatic α,ω-dicarboxylic acid having 4 to 20 carbon atoms, is used as the dicarboxylic acid component, terephthalic acid or isophthalic acid is preferably used in view of formability and barrier performance.

When the dicarboxylic acid, other than the straight chain aliphatic α,ω-dicarboxylic acid, is used as the dicarboxylic acid component, the ratio of use thereof is less than 50 mol % of the structural unit derived from dicarboxylic acid, which is preferably 30 mol % or less, more preferably 1 to 25 mol %, and particularly 5 to 20 mol %.

Besides the diamine component and the dicarboxylic acid component, the XD-based polyamide used in this invention may contain, as a copolymerization component, lactams such as ε-caprolactam and laurolactam; and aliphatic aminocarboxylic acids such as aminocaproic acid and aminoundecanoic acid, without adversely affecting the effect of this invention. Content of these components other than the diamine component and the dicarboxylic acid component, which may be contained in the XD-based polyamide, is preferably 5% by weight or less of the polyamide resin, which is more preferably 1% by weight or less.

The polyamide resin used in this invention preferably has a number-average molecular weight (Mn) of 6,000 to 30,000, which is more preferably 8,000 to 28,000, even more preferably 9,000 to 26,000, yet more preferably 10,000 to 24,000, and furthermore preferably 11,000 to 22,000. Within these ranges, the heat resistance, elastic modulus, dimensional stability, and formability will be more improved.

The number-average molecular weight (Mn) is calculated by the equation below, using the terminal amino group concentration [NH$_2$] (microequivalent/g) and a terminal carboxy group concentration [COOH] (microequivalent/g):

$$\text{Number-average molecular weight of polyamide resin (Mn)} = 2,000,000/([\text{COOH}]+[\text{NH}_2])$$

The polyamide resin used in this invention preferably has a polydispersity (weight-average molecular weight/number-average molecular weight (Mw/Mn)) of 1.8 to 3.1. The polydispersity is more preferably 1.9 to 3.0, and even more preferably 2.0 to 2.9. With the polydispersity controlled within these ranges, a formed article that excels in mechanical characteristics will more likely be obtained.

The polydispersity of polyamide resin is controllable by making a suitable choice, for example, on types and amounts of initiator or catalyst used for polymerization, and polymerization conditions including reaction temperature, pressure and time. Alternatively, it is also controllable by mixing two or more types of polyamide resins with different average molecular weights obtained under different polymerization conditions, or by subjecting the polyamide resin after polymerization to fractional precipitation.

The polydispersity may be determined by GPC measurement. More specifically, employable are a measuring instrument "HLC-8320GPC" from Tosoh Corporation, two "TSKgel Super HM-H" columns from Tosoh Corporation, a sodium trifluoroacetate solution (10 mmol/L) in hexafluoroisopropanol (HFIP) as an eluent, wherein the measurement may be carried out with a resin concentration of 0.02% by weight, a column temperature of 40° C., and a flow rate of 0.3 mL/min, using a refractive index (RI) detector, and the polydispersity may be obtained referring to standard polymethyl methacrylate (PMMA) equivalent values. The analytical curve may be prepared by using PMMA dissolved in HFIP, with the concentration varied over 6 levels.

In this invention, the polyamide resin preferably has a melting point of 150 to 310° C., which is more preferably 180 to 300° C., and even more preferably 180 to 250° C.

The polyamide resin preferably has a glass transition temperature of 50 to 100° C., which is more preferably 55 to 100° C., and particularly preferably 60 to 100° C. Within these ranges, the obtainable sheet will be more likely to have improved heat resistance.

The melting point in the context of this invention means a temperature at which a peak top of the exothermic peak shows in DSC (differential scanning calorimetry) during the heating process. The glass transition temperature is measured after once heating and melting a sample so as to cancel any influences of the thermal history on the crystallinity, and by heating the sample again.

The measurement may be conducted typically by using a differential scanning calorimeter. Approximately 3 mg of the sample (resin) is used, nitrogen gas is fed as an atmospheric gas at a flow rate of 30 ml/min, the sample is heated at a heating rate of 10° C./min from room temperature up to a temperature above a predicted melting point, wherein the melting point may be determined from the temperature at which is determined from the peak top of the endothermic peak. The sample is then rapidly cooled on dry ice, and re-heated up to a temperature above the melting point at a heating rate of 10° C./min, thereby, determining the glass transition point. The differential scanning calorimeter employable here is "DSC-60" from Shimadzu Corporation.

<<<Thermoplastic Resin Composition>>>

In this invention, the thermoplastic resin fiber used for the yarn is preferably composed of a thermoplastic resin composition that contains a thermoplastic resin as a major ingredient, and is more preferably composed of a polyamide resin composition that contains a polyamide resin as a major ingredient. "Major ingredient" means a component whose content in the thermoplastic resin composition is largest, and typically accounts for 50% by weight or more of the thermoplastic resin composition, which is preferably 70% by weight or more, and even more preferably 90% by weight or more.

The thermoplastic resin composition used in this invention may contain a laser light absorber. The laser light absorber is selected depending on the wavelength of laser light. For example, when YAG laser with a wavelength of 1064 nm is used as a light source, dye and/or pigment that strongly absorbs light at 1064 nm may be used as the laser light absorber. More specifically, carbon black, and the laser light absorbers described in paragraph [0034] of JP-A-2015-026618 are exemplified, the contents of which are incorporated by reference into this specification. When the thermoplastic resin composition used in this invention contains the laser light absorber, the content is preferably 0.001 to 5 parts by weight per 100 parts by weight of the thermoplastic resin, which is more preferably 0.005 to 1 parts by weight, and even more preferably 0.02 to 0.5 parts by weight.

In another preferred embodiment, the thermoplastic resin composition used in this invention contains substantially no laser light absorber. The phrase " . . . contains substantially no . . . " means that the content is less than 0.001 parts by weight, per 100 parts by weight of thermoplastic resin.

The polyamide resin composition used in this invention may additionally contain additives such as antioxidant, stabilizers such as heat stabilizer, hydrolysis resistance modifier, weathering stabilizer, matting agent, nucleating agent, plasticizer, dispersion aid, flame retardant antistatic agent, anti-coloring agent, antigelling agent, mold releasing agent and lubricant, without adversely affecting the purpose and effects of this invention. Regarding details of these additives, the description in paragraphs [0130] to [0155] of JP-B1-4894982 may be referred to, the contents of which are incorporated by reference into this specification.

In one preferred embodiment of the thermoplastic resin composition used in this invention, exemplified is a composition in which the thermoplastic resin accounts for 70% by weight or more (more preferably 80% by weight or more, even more preferably 90% by weight or more, and yet more preferably 95% by weight or more) of the thermoplastic resin composition.

<<Continuous Reinforcing Fiber>>

The continuous reinforcing fiber used in this invention means a continuous reinforcing fiber having a number-average fiber length exceeding 10 mm, wherein the number-average fiber length preferably exceeds 30 mm. The lower limit of the number-average fiber length of continuous reinforcing fiber used in this invention is not specifically limited, but is preferably 1 m or longer, more preferably 5 m or longer, even more preferably 100 m or longer, and yet more preferably 1000 m or longer. The upper limit of the number-average fiber length of continuous reinforcing fiber is not specifically limited, but is preferably 20,000 m or shorter for good formability, which is more preferably 10,000 m or shorter, and even more preferably 7,000 m or shorter.

The continuous reinforcing fiber in this invention may have a circular or flattened cross-sectional shape.

The continuous reinforcing fiber used in this invention is exemplified by inorganic fibers such as glass fiber, carbon fiber, alumina fiber, boron fiber, ceramic fiber, and metal fiber (steel fiber, etc.); and organic fibers such as aramid fiber, plant fiber (including Kenaf fiber, bamboo fiber, etc.), polyoxymethylene fiber, aromatic polyamide fiber, polyparaphenylene benzobisoxazole fiber, and ultrahigh molecular weight polyethylene fiber. Among them, at least one of carbon fiber, aramid fiber and glass fiber is preferably contained, at least either carbon fiber or glass fiber is more preferably contained, and at least one type of glass fiber is even more preferably contained. By using the glass fiber, the light will more likely be scattered, and the shape retainability and uniformity of molten state will more likely be improved.

The continuous reinforcing fiber used in this invention is exemplified by a continuous reinforcing fiber bundle in which a plurality of continuous reinforcing fibers are gathered into a bundle. In this embodiment, preferably used is a continuous reinforcing fiber whose number-average fiber length is 1 m or above, at the shortest.

In other embodiment of the continuous reinforcing fiber used in this invention, the continuous reinforcing fiber has a number-average fiber length of 30 to 150 mm. Such continuous reinforcing fiber is exemplified by "stretch-broken carbon fiber".

The continuous reinforcing fiber used in this invention is preferably treated with a treatment agent. The treatment agent is exemplified by sizing agent and surface modifier. Those described in paragraphs [0093] and [0094] of JP-B1-4894982 may be referred to, the contents of which are incorporated by reference into this specification.

More specifically, the treatment agent used in this invention is preferably at least one of epoxy resin, urethane resin, silane compounds, isocyanate compounds, titanate compounds, and polyamide resin; wherein at least one of epoxy resin, urethane resin, silane coupling agent, water-insoluble polyamide resin and water-soluble polyamide resin is more preferable; at least one of epoxy resin, urethane resin, water-insoluble polyamide resin and water-soluble polyamide resin is even more preferable; and water-soluble polyamide resin is yet more preferable.

The amount of consumption of the treatment agent is preferably 0.001 to 1.5% by weight of the continuous reinforcing fiber, which is more preferably 0.1 to 1.2% by weight, and even more preferably 0.3 to 1.1% by weight.

Methods for treating the continuous reinforcing fiber with the treatment agent may follow any of known methods. For example, the continuous reinforcing fiber may be dipped in a solution having a treatment agent dissolved therein, so as to allow the treatment agent to adhere on the surface of the continuous reinforcing fiber. Alternatively, the treatment agent may be blown by air onto the surface of the continuous reinforcing fiber. Still alternatively, a continuous reinforcing fiber having already been treated with a surface modifier or treatment agent may be used, or a commercially available product may be once cleaned of the surface modifier or treatment agent having been adhered on the surface thereof, and then treated again with a desired amount of treatment agent.

<<Commingled Yarn>>

As described above, the yarn used in this invention is preferably a commingled yarn. The commingled yarn contains the continuous reinforcing fiber and the thermoplastic resin fiber, wherein the continuous reinforcing fiber is dispersed in the thermoplastic resin fiber, and, at least a part of the thermoplastic resin fiber remain in the fiber shape, without being impregnated into the continuous reinforcing fiber.

Dispersion of the continuous reinforcing fiber in the commingled yarn is preferably 60 to 100%, more preferably 60 to 99%, even more preferably 63 to 99%, particularly 68 to 99%, and may even be 80 to 99%. Within these ranges, the thermoplastic resin fiber will more easily be impregnated into the continuous reinforcing fiber, and the obtainable formed article will have therein less gaps. The dispersion is measured according to the method described later in EXAMPLES.

In most cases, impregnation ratio of the thermoplastic resin fiber in the commingled yarn is preferably 20% or below, more preferably 15% or below, even more preferably 5% or below, yet more preferably 3% or below, and even may be 1% or below.

The ratio of impregnation in commingled yarn may be measured by the method below.

The commingled yarn is cut, embedded in an epoxy resin, a cross-sectional surface of the embedded commingled yarn, taken perpendicularly to the longitudinal direction of yarn is polished, and the cross sectional surface is then photographed under a ultra-deep color 3D shape analyzing microscope (for example, ultra-deep color 3D shape analyzing microscope VK-9500 (control unit)/VK-9510 (measurement unit) (from Keyence Corporation)). On the thus obtained cross-sectional image, regions where thermoplastic resin-derived component is impregnated into the continuous reinforcing fiber are picked up using image analyzing software (for example, ImageJ), and the area is measured. The ratio of impregnation is calculated by (area of region where theremoplastic resin-derived component is impregnated into continuous reinforcing fiber)/(photographed cross-sectional area) (in %).

In the commingled yarn used in this invention, the continuous reinforcing fiber or the thermoplastic resin fiber typically accounts for 95% by weight or more of fibers that compose the commingled yarn.

The commingled yarn used in this invention is preferably a bundle of the continuous reinforcing fiber and the thermoplastic resin fiber, gathered with the aid of the treatment agent applied to at least either one of the continuous reinforcing fiber or the thermoplastic resin fiber.

The commingled yarn is typically manufactured by using a thermoplastic resin fiber bundle and a continuous reinforcing fiber bundle. Total fineness of fibers used for manufacturing a single commingled yarn (a sum of the total fineness of the thermoplastic resin fiber, and the total fineness of the continuous reinforcing fiber, used for manufacturing a single commingled yarn) is preferably 500 to 5000 dtex when glass fiber is used as the continuous reinforcing fiber, which is more preferably 700 to 3000 dtex, even more preferably 900 to 2000 dtex, and particularly preferably 900 to 1500 dtex. When carbon fiber is used as the continuous reinforcing fiber, the total fineness is preferably 1000 to 100000 dtex, more preferably 1500 to 50000 dtex, even more preferably 2000 to 50000 dtex, and particularly preferably 3000 to 30000 dtex.

The total number of fibers used for manufacturing a single commingled yarn (sum of the total number of fibers of the thermoplastic resin fiber and the total number of fibers of the continuous reinforcing fiber) is preferably 50 to 3000 f when glass fiber is used as the continuous reinforcing fiber, which is more preferably 100 to 2000 f, even more preferably 200 to 1000 f, and yet more preferably 300 to 800 f. When carbon fiber is used as the continuous reinforcing fiber, the total number of fibers is preferably 100 to 100000 f, more preferably 1000 to 100000 f, even more preferably 1500 to 70000 f, and yet more preferably 2000 to 20000 f. Within these ranges, the commingled yarn will have improved commingling performance, and thereby the obtainable formed article will have improved physical properties and texture. The formed article will also have both fibers uniformly dispersed therein, without producing regions where either one of them is abundant.

The commingled yarn used in this invention may be twisted. Method for twisting is a matter of free choice from known methods, without special limitation. Number of twisting is suitably determined depending on the type of thermoplastic resin used for the thermoplastic resin fiber; number of fibers and fineness of the thermoplastic resin fiber bundle; types, number of fibers and fineness of the continuous reinforcing fiber; and ratio of number of fibers and ratio of fineness between the thermoplastic resin fiber and the continuous reinforcing fiber. The number of twisting may typically be 1 to 200 turns/m (fiber length), which may further be 1 to 100 turns/m, 1 to 70 turns/m, 1 to 50 turns/m, or 10 to 30 turns/m. With such design, the formed article will have improved mechanical strength.

<Mode of Embodiment>

The method for manufacturing a formed article of this invention may suitably be employed as a method for manufacturing a pre-processed article (provisional formed article). For example, as illustrated in FIG. 2, the sheet may partially be irradiated with laser light to melt therein the thermoplastic resin fiber for impregnation, thereby the sheet may partially be kept in shape, suppressed from causing loosening or fluffing of the fibers, and may be improved in handleability in subsequent processes.

Figure 3:
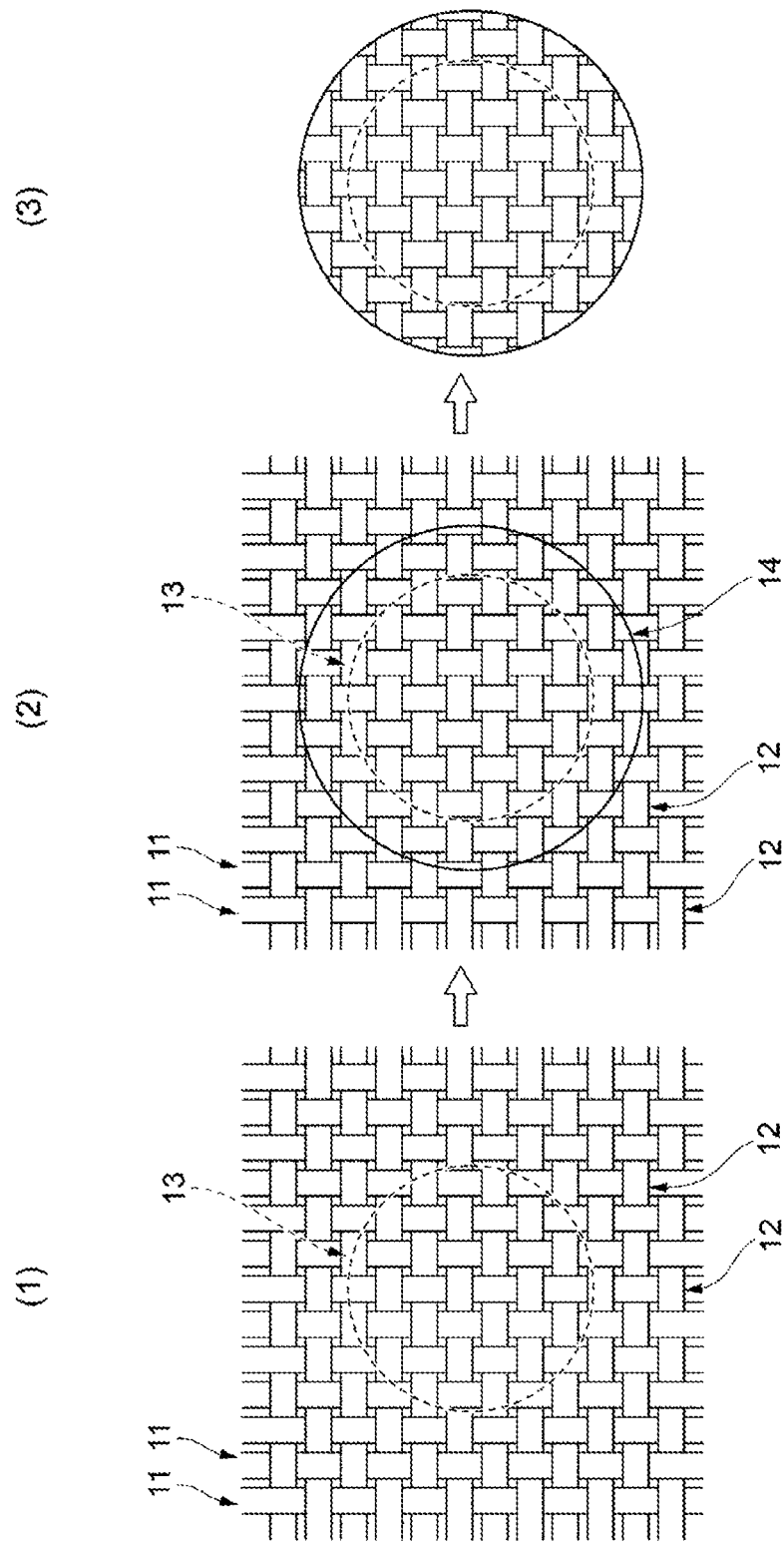
FIG. 3 is a schematic drawing illustrating an exemplary embodiment of this invention.

Alternatively, as illustrated in FIG. 3, the sheet is once irradiated with laser light according to the method for manufacturing a formed article of this invention for bordering (FIG. 3(1)), and further irradiated with laser light with higher intensity (FIG. 3(2)) to cut out a necessary part (FIG. 3(3)). Reference numeral 13 in FIG. 3(2) indicates the irradiation area defined by laser irradiation for bordering as pre-processing, and reference numeral 14 indicates the irradiation area to be cut out as the necessary part from the sheet. Irradiation conditions of laser light for bordering may be same as those for shape retaining, with the same preferred ranges. Intensity of laser light for cutting out the necessary part is preferably 10 to 50 J/mm higher than the intensity necessary for shape retaining, although depending on material types. Difference between laser light intensity for shape retaining and laser light intensity for cutting out may be emphasized by adding a laser light absorber to the thermoplastic resin.

The method for manufacturing a formed article of this invention may advantageously be used for preliminary impregnation of the thermoplastic resin. That is, the sheet is irradiated with laser light so as to cause preliminary impregnation of the thermoplastic resin, and may further be irradiated with laser light so as to allow impregnation of the thermoplastic resin to proceed. More specifically, the sheet used in this invention may be preliminarily impregnated with the thermoplastic resin, and then placed in a mold, to be formed in a desired shape. By employing such means, the formability may further be improved.

The preliminary impregnation is also beneficial in suppressing the sheet during processing from creasing or causing dimensional change, due to radiation heat from IR heater, halogen heater or press machine.

The method for manufacturing a formed article of this invention is used not only for shape retaining of sheet only, but also for shape retaining of sheet with a different material (base, etc.). For example, the sheet used in this invention is placed on the surface of a base, the laser light is irradiated from the sheet side, so as to proceed shape retaining of the yarns in the sheet, while melt-bonding the base and the sheet. The base is exemplified by the sheet used in this invention, thermoplastic resin film, metal foil, metal plate, and glass plate. The melt-bonding of the base and the sheet may effectively be allowed to proceed, by positioning the focal point of laser light at around the interface between the base and the sheet.

The formed article obtained by the manufacturing method of this this invention is suitably applicable, for example, to parts and housings of electric/electronic equipment including personal computer, office automation equipment, audiovisual equipment and mobile phone; optical equipment; precision equipment; toy; home/office electric appliance; and further to parts of automobile, aircraft and vessel. The method is particularly suitable for manufacturing a formed article with surface irregularity.

EXAMPLES

This invention will more specifically be explained referring to Examples. Materials, amounts of consumption, ratios, details of processes and procedures of processes are suitably modified without departing from the spirit of this invention. The scope of this invention is, therefore, by no means limited to the specific Examples below.
<Exemplary Synthesis of Polyamide Resin MP10>

Into a reaction vessel equipped with a stirrer, a partial condenser, a total condenser, a thermometer, a dropping funnel, a nitrogen feeding tube, and a strand die, placed were 10 kg (49.4 mol) of sebacic acid (TA grade, from Itoh Oil Chemicals Co., Ltd.) and 11.66 g of sodium acetate/sodium hypophosphite monohydrate (molar ratio=1/1.5), the system was thoroughly replaced with nitrogen gas, and then heated up to 170° C. for melting under stirring while feeding a small amount of nitrogen gas. Into such molten sebacic acid, added dropwise under stirring was 6.647 kg of mixed xylylenediamine containing metaxylylenediamine and paraxylylenediamine with a molar ratio of 70:30 (34.16 mol of metaxylylenediamine, and 14.64 mol of paraxylylenediamine, from Mitsubishi Gas Chemical Company, Inc.), and the inner temperature was continuously elevated over 2.5 hours up to 240° C. while discharging water resulted from the condensation process out of the system.

After completion of the dropwise addition, the inner temperature was elevated, and upon reaching 250° C., the reaction vessel was evacuated, the inner temperature was further elevated, so as to allow the melt polycondensation reaction to proceed at 255° C. for 20 minutes. The system was then pressurized with nitrogen gas, the obtained polymer was taken out through the strand die, and pelletized. Polyamide resin MP10 was thus obtained.

The thus obtained polyamide resin was found to have a melting point of 213° C., and a number-average molecular weight of 15400.
<Thermoplastic Resin>
MP10: Resin obtained in Exemplary Synthesis described above
MXD6: Metaxylylene adipamide resin, 6001 from Mitsubishi Gas Chemical Company, Inc., melting point=237° C., number-average molecular weight=16800
Polyamide 66 (PA66): CM3001N, from Toray Industries, Inc., melting point=265° C.
<Continuous Reinforcing Fiber>
Continuous glass fiber (GF): ECG 75 1/0 0.7Z, from Nitto Boseki Co., Ltd., fineness=687 dtex, number of fibers=400 f, surface treated with sizing agent
Continuous carbon fiber (CF): Pyrofil-TR-50S-12000-AD, from Mitsubishi Rayon Co., Ltd., fineness=8000 dtex, number of fibers=12000 f, surface treated with epoxy resin
<Manufacture of Thermoplastic Resin Fiber>

The thermoplastic resin, kept in a molten state, was extruded at a temperature 30° C. higher than the melting point of the thermoplastic resin, through a 48 hole-strand die using a single screw extruder equipped with a 30 mm diameter screw, drawn while being taken up on a roll, to thereby obtain a thermoplastic resin fiber bundle wound up on a spool. The fineness was 165 dtex, and a number of fibers was 48 f.
<Manufacture of Commingled Yarn>
<<Commingled Yarn (1) Having Thermoplastic Resin (MP10) Fiber and Continuous Glass Fiber as Fiber Components>>

Commingled yarn (1), having the thermoplastic resin (MP10) fiber and the continuous glass fiber as the fiber components, was manufactured according to the method below.

From two spools having wound thereon the thermoplastic resin (MP10) fiber of 1 m or longer, and one spool having wound thereon the continuous glass fiber of 1 m or longer, the individual fibers were drawn out, and opened while allowing them to pass through a plurality of guides by an air flow. While being opened, the thermoplastic resin (MP10) fibers and the continuous glass fiber were gathered into a bundle, and further allowed to pass through a plurality of guides by an air blow, for advanced uniformity. The obtained fiber bundle was dipped in an aqueous solution containing a treatment agent (AQ Nylon T70, from Toray Industries, Inc.) for 10 seconds, and then dried at 40° C. for 60 minutes. Commingled yarn (1) was thus obtained. The commingled yarn (1) was found to contain 0.5% by weight of the treatment agent. The continuous glass fiber in the commingled yarn (1) was found to account for 67% by weight.

The commingled yarn was found to have a fineness of 1017 dtex, and a number of fibers of 496 f.
<<Commingled Yarn (2) Having Thermoplastic Resin (MXD6) Fiber and Continuous Glass Fiber as Fiber Components>>

Commingled yarn (2), having the thermoplastic resin (MXD6) fiber and the continuous glass fiber as the fiber components, was manufactured in the same way as in the manufacture of commingled yarn (1), except that MXD6 was used in place of MP10.

The thus obtained commingled yarn (2) was found to contain 0.5% by weight of a treatment agent. The commingled yarn (2) was also found to contain 67% by weight of continuous glass fiber.

Commingled yarn (2) was found to have a fineness of 1018 dtex, and a number of fibers of 496 f.

<<Commingled Yarn (3) Having Thermoplastic Resin (MP10) Fiber and Continuous Carbon Fiber as Fiber Components>>

Commingled yarn (3), having the thermoplastic resin (MP10) fiber and the continuous carbon fiber as the fiber components, was manufactured according to the method below.

From 30 spools having wound thereon the thermoplastic resin (MP10) fiber of 1 m or longer, and one spool having wound thereon the continuous carbon fiber of 1 m or longer, the individual fibers were drawn out, and opened while allowing them to pass through a plurality of guides by an air flow. While being opened, the thermoplastic resin (MP10) fibers and the continuous carbon fiber were gathered into a bundle, and further allowed to pass through a plurality of guides on an air blow, for advanced uniformity. The obtained fiber bundle was dipped in an aqueous solution containing a treatment agent (AQ Nylon T70, from Toray Industries, Inc.) for 10 seconds, and then dried at 40° C. for 60 minutes. Commingled yarn (3) was thus obtained. The commingled yarn (3) was found to contain 0.5% by weight of the treatment agent. The continuous glass fiber in the commingled yarn (3) was found to account for 62% by weight.

Commingled yarn (3) was found to have a fineness of 12950 dtex, and a number of fibers of 13440 f.

<Manufacture of Commingled Yarn>

<<Commingled Yarn (4) Having Thermoplastic Resin (PA66) Fiber and Continuous Glass Fiber as Fiber Component>>

Commingled yarn (4), having the thermoplastic resin (PA66) fiber and the continuous glass fiber as the fiber components, was manufactured according to the method below.

From two spools having wound thereon the thermoplastic resin (PA66) fiber of 1 m or longer, and one spool having wound thereon the continuous glass fiber of 1 m or longer, the individual fibers were drawn out, and opened while allowing them to pass through a plurality of guides by an air flow. While being opened, the thermoplastic resin (PA60) fibers and the continuous glass fiber were gathered into a bundle, and further allowed to pass through a plurality of guides on an air blow, for advanced uniformity. The obtained fiber bundle was dipped in an aqueous solution containing a treatment agent (AQ Nylon T70, from Toray Industries, Inc.) for 10 seconds, and then dried at 40° C. for 60 minutes. Commingled yarn (4) was thus obtained. The commingled yarn (4) was found to contain 0.5% by weight of the treatment agent. The continuous glass fiber in the commingled yarn (4) was found to account for 67% by weight.

Commingled yarn (4) was found to have a fineness of 1017 dtex, and a number of fibers of 496 f.

<Measurement of Dispersion of Commingled Yarn>

The dispersion of commingled yarn was observed and measured as described below.

The commingled yarn was cut, embedded in an epoxy resin, a cross-sectional surface of the embedded commingled yarn, taken perpendicularly to the longitudinal direction of yarn was polished, and the cross sectional surface was then photographed under a ultra-deep color 3D shape analyzing microscope (for example, ultra-deep color 3D shape analyzing microscope VK-9500 (control unit)/VK-9510 (measurement unit) (from Keyence Corporation)). On the thus obtained cross-sectional image, determined were cross-sectional area of commingled yarn; the total area of regions seen in the cross-section of the commingled yarn, which are solely occupied by the continuous reinforcing fiber and have an area of 31400 $\mu m^2$ or larger; and the total area of regions seen in the cross-section of the commingled yarn, which are solely occupied by the thermoplastic reinforcing fiber and have an area of 31400 $\mu m^2$ or larger, were determined, and the dispersion was calculated using the equation below. The areas were measured using a digital microscope.

$$D(\%)=(1-(Lcf+Lpoly)/Ltot)*100 \quad \text{[Mathematical Formula 1]}$$

(in the formula, D represents dispersion, Ltot represents cross-sectional area of commingled yarn, Lcf represents the total area of regions seen in the cross-section of the commingled yarn, which are solely occupied by the continuous reinforcing fiber and have an area of 31400 $\mu m^2$ or larger, and Lpoly represents the total area of regions seen in the cross-section of the commingled yarn, which are solely occupied by the thermoplastic resin fiber, and have an area of 31400 $\mu m^2$).

<Manufacture of Woven Fabric>

The thus obtained commingled yarns were used as the warps and the wefts, and woven using a rapier loom into plain weave fabrics, so that the fabrics will have a weight of 100 $g/m^2$ when using commingled yarn (1), a weight of 100 $g/m^2$ when using commingled yarn (2), and a weight of 200 $g/m^2$ when using commingled yarn (3). The widths of the warps and the wefts in the fabrics were 0.8 mm for commingled yarn (1), 0.8 mm for commingled yarn (2), and 1.5 mm for commingled yarn (3).

Example 1

The thus obtained fabrics were irradiated with laser light according to the conditions below.

Laser light irradiation apparatus: FD2230, from Fine Device Co., Ltd.
Laser light type: Nd:YAG laser
laser light intensity: 20 J/mm
Scanning speed: 3 mm/sec
Position of focal point: Approximately at center of thickness of sheet
Width of beam spot: 1.5 mm
Direction of irradiation of laser light: laser light was irradiated on each fabric in the direction perpendicular to the fabric surface, while linearly scanning the beam in the direction inclined by each angle listed in Table 1, away from the direction of arrangement of the commingled yarns that compose the warps (that is, in Example 1, laser light was irradiated so as to satisfy aforementioned condition A over approximately 100% of the laser irradiation area).

The obtained formed articles were evaluated as below.

<<Evaluation of Shape Retainability>>

The shape retainability of the thus obtained formed articles were observed in the laser light irradiation areas and in the peripheral areas.

A: Shape well retained.
B: Shape unevenly retained, causing slight shift in part of fibers during scanning.
C: Shape not retained, causing remarkable shift in fibers during scanning.

<<Appearance of Formed Article>>

The appearances of the thus obtained formed articles were observed in the laser light irradiation areas and in the peripheral areas.

A: Obtained as designed, without deformation.
B: Crease or loosened weave partially found.
C: Remarkable crease or loosened weave found.

<<Uniformity of Molten State>>

The molten state of the thus obtained formed sheets were observed in a surficial part on one surface side and in a surficial part on the other surface side.
A: Uniform molten state.
B: Unmelted portion or resin pool partially found.
C: Remarkable unmelted portion or resin pool found.

Examples 2 to 6, Comparative Example 1

All conducted in the same way as in Example 1, except that the scanning angle of laser light was changed from 5° to the individual angles listed in Table 1; the types of thermoplastic resin fiber and the continuous reinforcing fiber were changed; and the laser light intensity was set to 5 J/mm for the case where the carbon fiber was used as the continuous reinforcing fiber.

Example 8

Laser light was irradiated in the same way as in Comparative Example 1, except that a stage on which the fabric is placed was inclined so that the angle of irradiation will be 45° away from the direction perpendicular to the sheet plane.

Example 9

All conducted in the same way as in Example 1, except that the scanning angle of laser light was changed from 5° to the angle listed in Table 1; and the type of thermoplastic resin fiber was changed.

REFERENCE SIGNS LIST 11 warp
12 weft
13 laser light irradiation area
14 laser light irradiation area
15 width of yarn composing woven fabric

The invention claimed is:

1. A method for manufacturing a formed article, the method comprising irradiating laser light onto a sheet having, arranged therein with a certain directionality, yarns that contain a thermoplastic resin fiber and a continuous reinforcing fiber, so as to allow at least a part of the thermoplastic resin fiber to be impregnated into the continuous reinforcing fiber,
   the laser light being irradiated so as to satisfy at least one of A or B below, over at least 70% or more of the laser irradiation area:
   A: irradiated in a direction 5 to 85° away from the direction of arrangement of yarns in the in-plane direction of the sheet; and
   B: irradiated in a direction 30 to 60° away from the direction perpendicular to the sheet plane,
   wherein the laser light has an intensity of 1 to 50 J/mm.

2. The method for manufacturing a formed article of claim 1, wherein the yarns are commingled yarns that contain the thermoplastic resin fiber and the continuous reinforcing fiber.

3. The method for manufacturing a formed article of claim 1, wherein the sheet is a fabric using the yarns for at least one of warp or weft.

TABLE 1

| | Example 1 | Example 2 | Example 3 | Example 4 | Example 5 | Example 6 | Comparative Example 1 | Example 8 | Example 9 |
|---|---|---|---|---|---|---|---|---|---|
| Type of Thermoplastic Resin | MP10 | MP10 | MP10 | MP10 | MXD6 | MP10 | MP10 | MP10 | PA66 |
| Type of Commingled Yarn | GF | GF | GF | GF | GF | CF | GF | GF | GF |
| Dispersion of Commingled Yarn (%) | >80% | >80% | >80% | >80% | >80% | >80% | >80% | >80% | >80% |
| Irradiating Direction of Laser Light (°) | 5 | 15 | 30 | 45 | 30 | 30 | 0 | 0 | 30 |
| Irradiating Direction to the Direction Perpendicular to the Sheet Plane | 0 | 0 | 0 | 0 | 0 | 0 | 0 | 45 | 0 |
| Shape Retainability | B | A | A | A | A | B | C | A | A |
| Appearance of Formed Article | B | A | A | A | A | A | C | A | A |
| Uniformity of Molten State | A | A | A | A | A | B | C | A | A |

In all of Examples and Comparative Example, the thermoplastic resin fibers were found to partially melt, and to be impregnated into the continuous reinforcing fiber.

The formed articles obtained by the manufacturing method of this invention were found to excel in shape retainability and appearance, as well as in the molten state (Examples 1 to 6, 8 and 9). In contrast, when the laser light was irradiated on the surface of fabric, in the direction parallel to the direction of arrangement of the commingled yarns that compose the warps (Comparative Example 1), the formed article was found to be poor in shape retainability and appearance, as well as in the molten state.

Example 7

All conducted in the same way as in Example 3, except that the laser light was irradiated while scanning it so as to draw a 50 mm diameter circle. The obtained formed article was evaluated as "B", regarding both of shape retainability and appearance.

4. The method for manufacturing a formed article of claim 1, wherein the yarns in the sheet have a width within a range from −75% to 300% of a maximum width of beam spot of the laser light.

5. The method for manufacturing a formed article of claim 1, wherein the laser light is irradiated so as to satisfy at least A.

6. The method for manufacturing a formed article of claim 5, wherein the laser light is irradiated in a direction 10 to 80° away from the direction of arrangement of yarns in the in-plane direction of the sheet, over at least 70% or more of the laser irradiation area.

7. The method for manufacturing a formed article of claim 1, wherein the continuous reinforcing fiber contains at least one of carbon fiber or glass fiber.

8. The method for manufacturing a formed article of claim 1, wherein the continuous reinforcing fiber contains at least one type of glass fiber.

9. A method for manufacturing a formed article, the method comprising irradiating laser light onto a sheet having, arranged therein with a certain directionality, yarns that contain a thermoplastic resin fiber and a continuous reinforcing fiber, so as to allow at least a part of the thermoplastic resin fiber to be impregnated into the continuous reinforcing fiber, the laser light being irradiated so as to satisfy at least one of A or B below, over at least 70% or more of the laser irradiation area:

A: irradiated in a direction 5 to 85° away from the direction of arrangement of yarns in the in-plane direction of the sheet; and B: irradiated in a direction 30 to 60° away from the direction perpendicular to the sheet plane, wherein the laser light is irradiated in a scanning mode and the laser light has a maximum width of beam spot of 0.5 to 6.0 mm.

10. The method for manufacturing a formed article of claim 1, wherein the thermoplastic resin contains a crystalline resin.

11. A method for manufacturing a formed article, the method comprising irradiating laser light onto a sheet having, arranged therein with a certain directionality, yarns that contain a thermoplastic resin fiber and a continuous reinforcing fiber, so as to allow at least a part of the thermoplastic resin fiber to be impregnated into the continuous reinforcing fiber, the laser light being irradiated so as to satisfy at least one of A or B below, over at least 70% or more of the laser irradiation area:

A: irradiated in a direction 5 to 85° away from the direction of arrangement of yarns in the in-plane direction of the sheet; and B: irradiated in a direction 30 to 60° away from the direction perpendicular to the sheet plane, wherein the thermoplastic resin fiber contains a polyamide resin that contains a structural unit derived from diamine and a structural unit derived from dicarboxylic acid, and 50 mol % or more of the structural unit derived from diamine is derived from xylylenediamine.

12. The method for manufacturing a formed article of claim 11, wherein the yarns are commingled yarns that contain the thermoplastic resin fiber and the continuous reinforcing fiber; and the laser light has an intensity of 1 to 50 J/mm.

13. The method for manufacturing a formed article of claim 11, wherein the yarns are commingled yarns that contain the thermoplastic resin fiber and the continuous reinforcing fiber;

the laser light has an intensity of 1 to 50 J/mm and;

the laser light has a maximum width of beam spot of 0.5 to 6.0 mm.

14. The method for manufacturing a formed article of claim 2, wherein the thermoplastic resin fiber contains a polyamide resin; and the polyamide resin contains a structural unit derived from diamine and a structural unit derived from dicarboxylic acid, and 50 mol % or more of the structural unit derived from diamine is derived from xylylenediamine.

15. The method for manufacturing a formed article of claim 3, wherein the thermoplastic resin fiber contains a polyamide resin; and the polyamide resin contains a structural unit derived from diamine and a structural unit derived from dicarboxylic acid, and 50 mol % or more of the structural unit derived from diamine is derived from xylylenediamine.

16. The method for manufacturing a formed article of claim 4, wherein the thermoplastic resin fiber contains a polyamide resin; and the polyamide resin contains a structural unit derived from diamine and a structural unit derived from dicarboxylic acid, and 50 mol % or more of the structural unit derived from diamine is derived from xylylenediamine.

17. The method for manufacturing a formed article of claim 5, wherein the thermoplastic resin fiber contains a polyamide resin; and the polyamide resin contains a structural unit derived from diamine and a structural unit derived from dicarboxylic acid, and 50 mol % or more of the structural unit derived from diamine is derived from xylylenediamine.

* * * * *